Dec. 27, 1955   R. H. BREEBACK   2,728,511
FILLING MACHINE
Filed Nov. 12, 1952   9 Sheets-Sheet 6

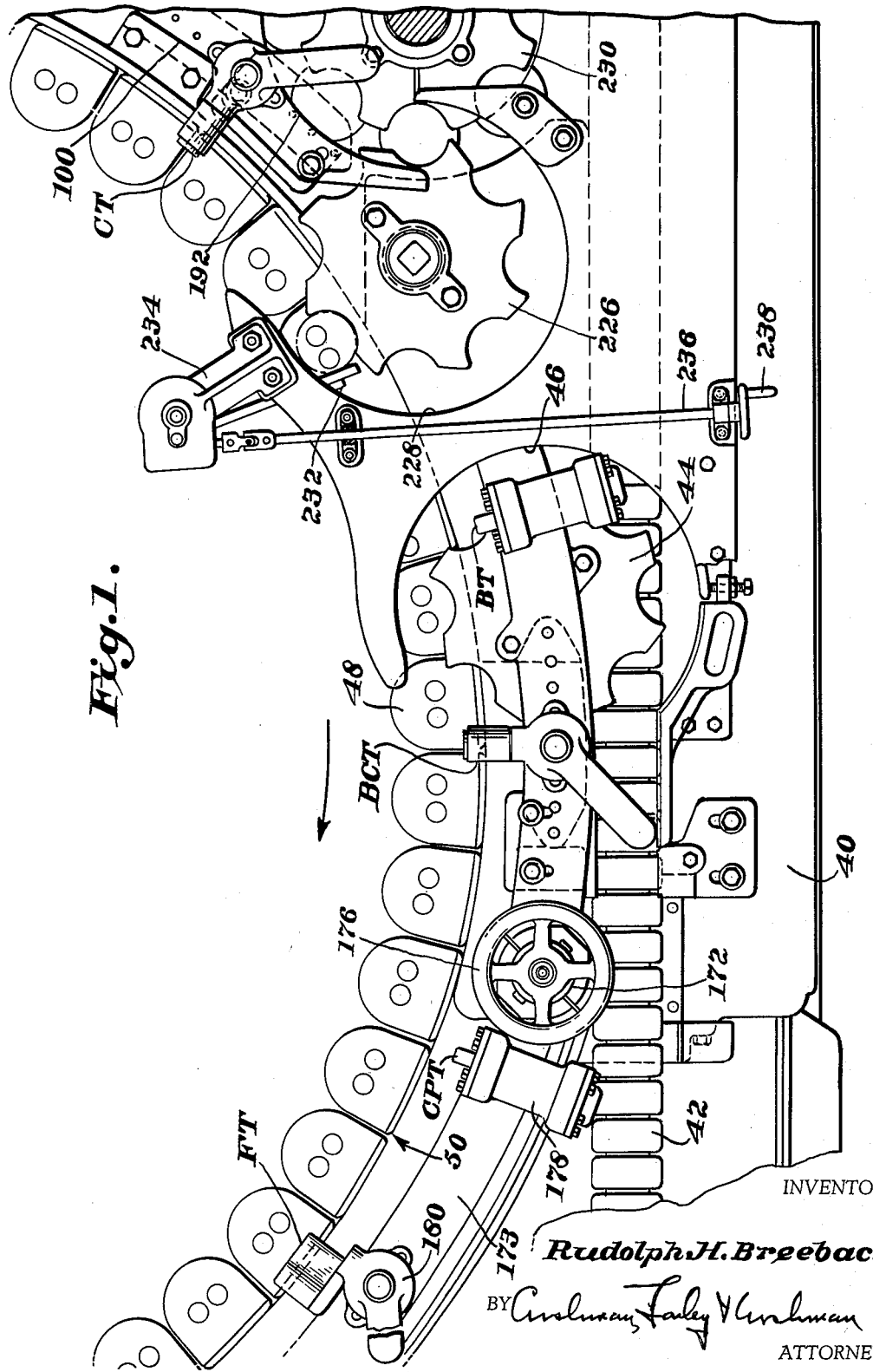

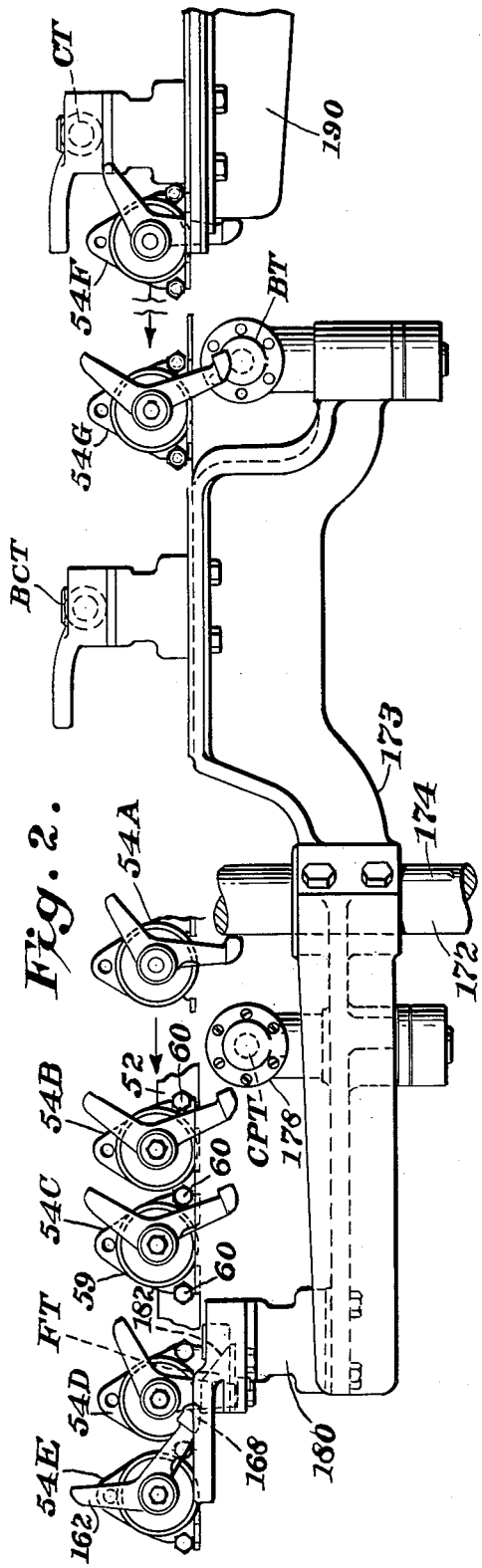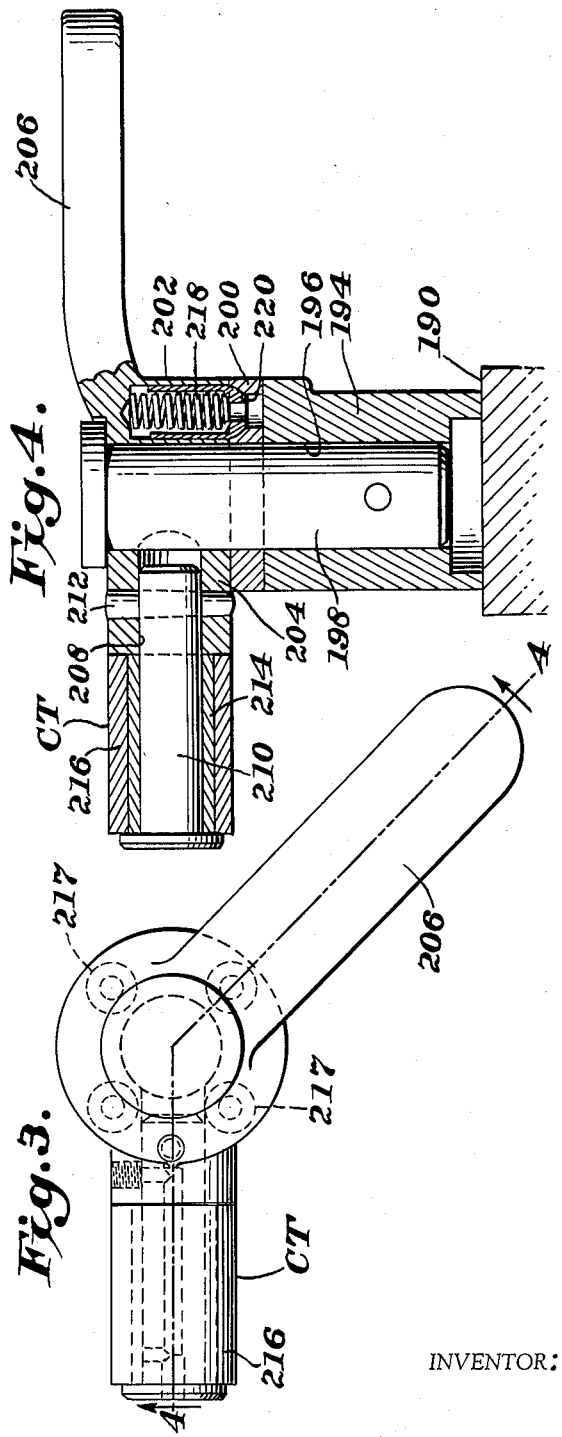

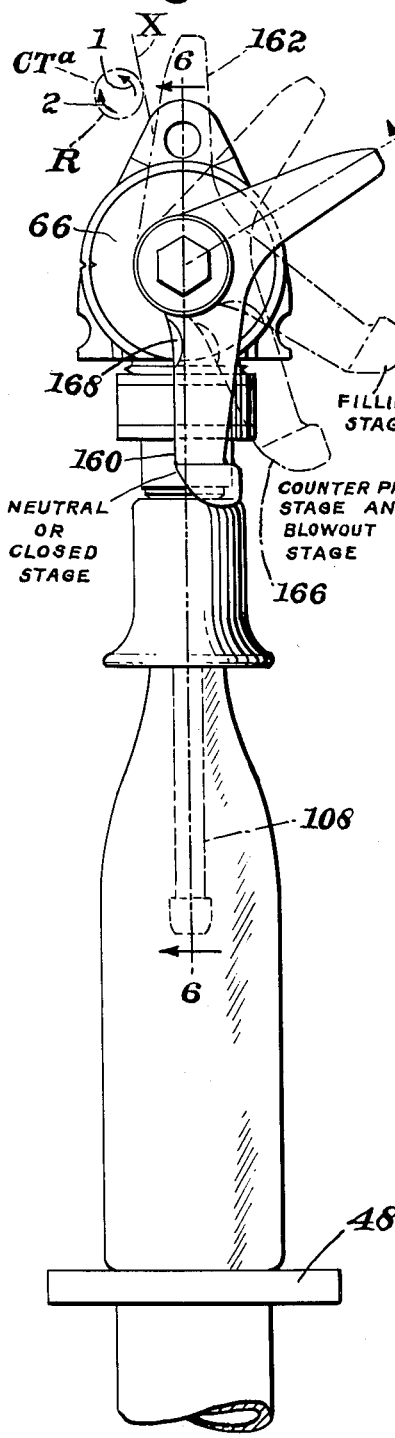
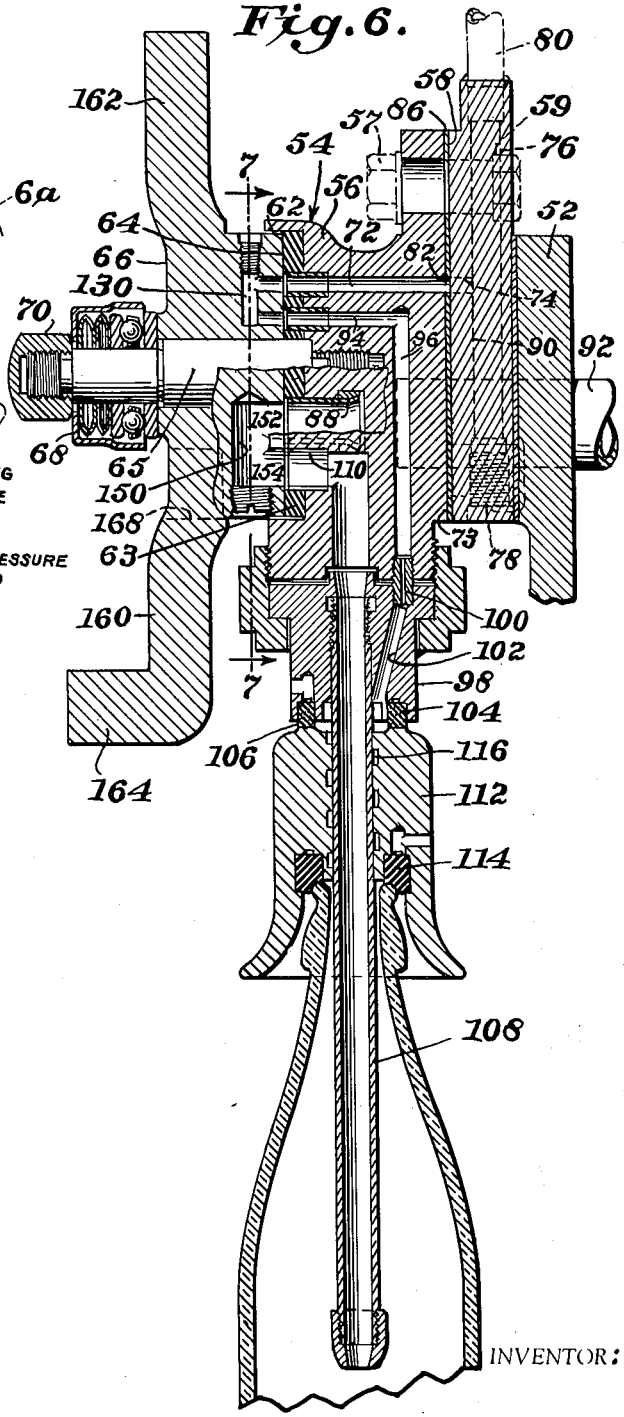

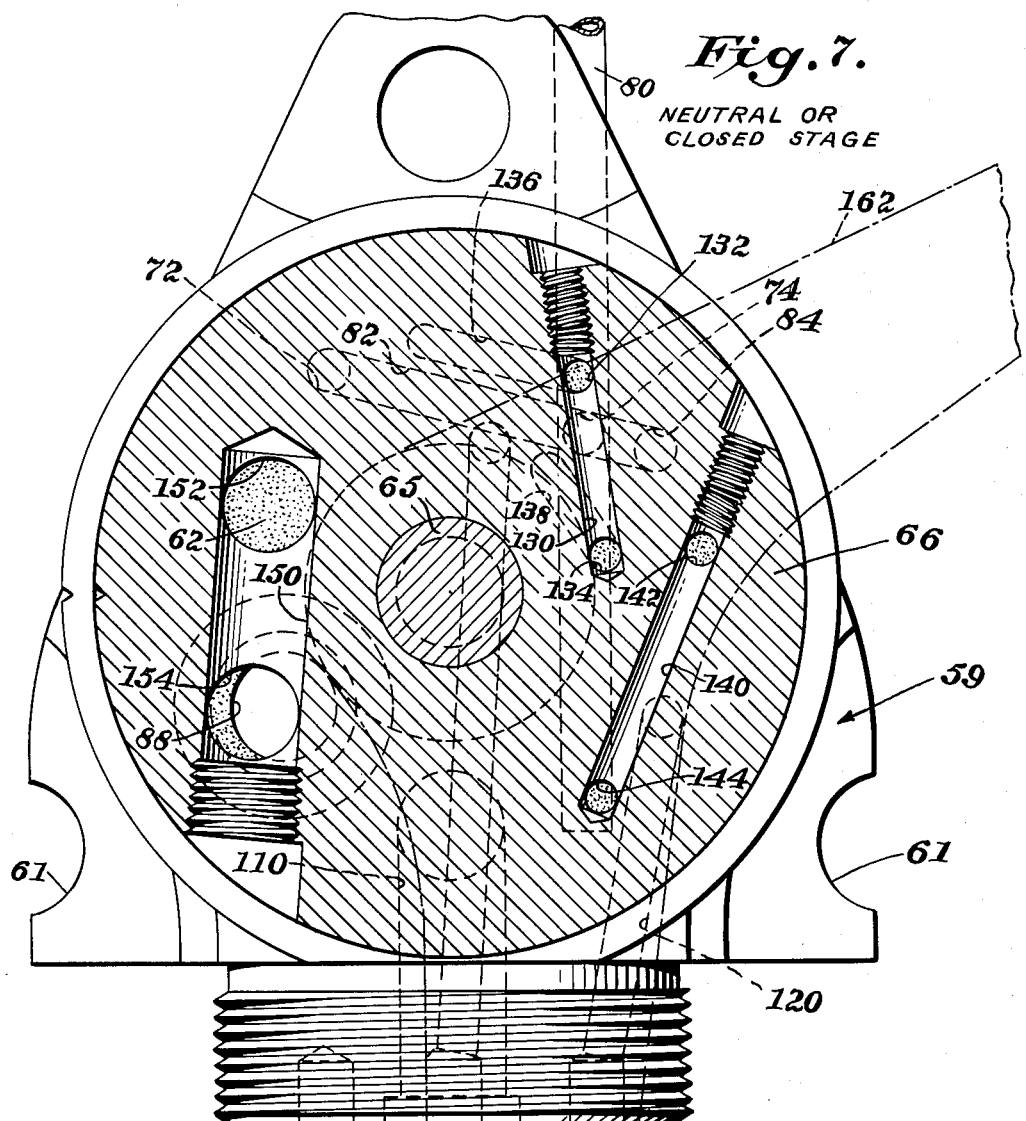

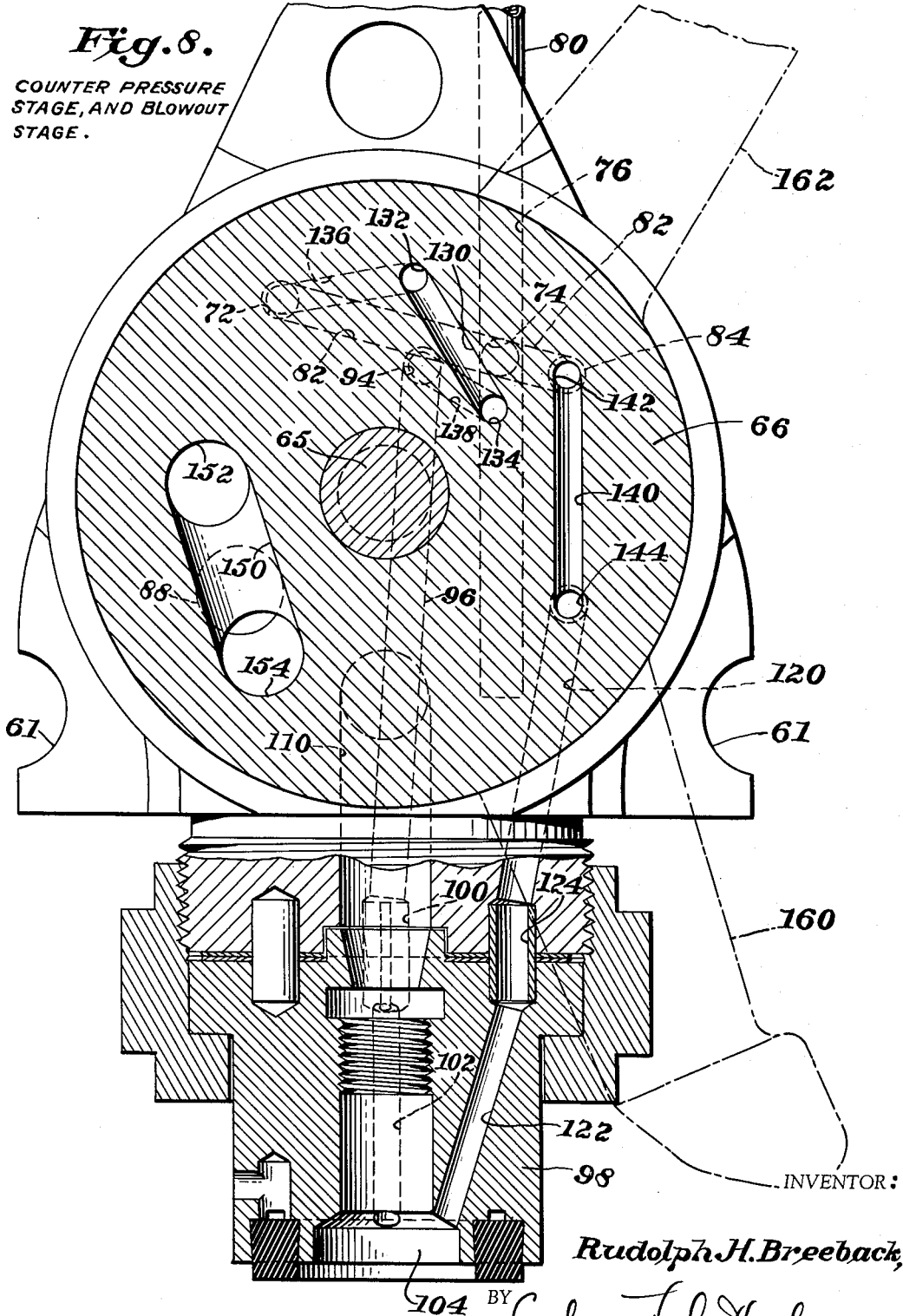

FILLING STAGE

INVENTOR:
Rudolph H. Breeback,
BY Cushman, Darby & Cushman
ATTORNEYS.

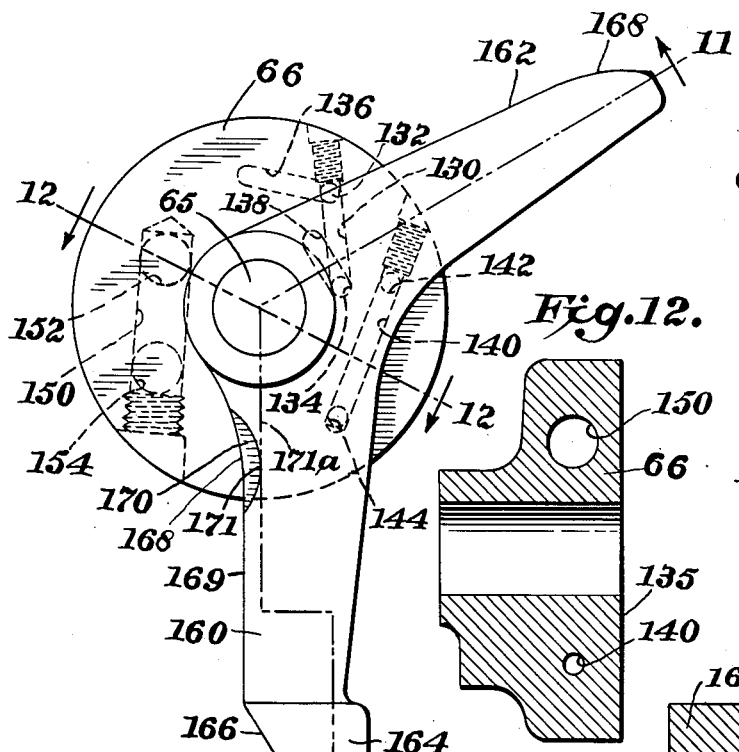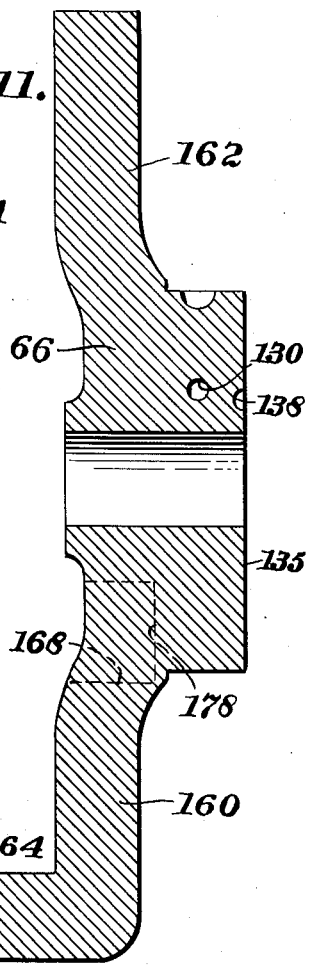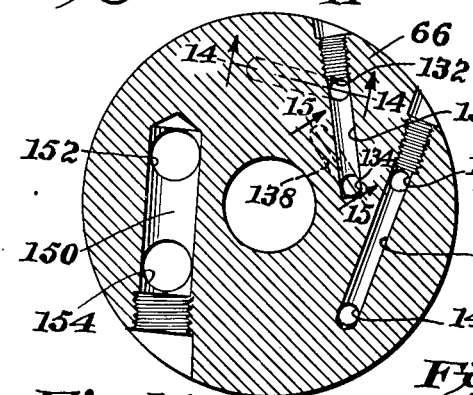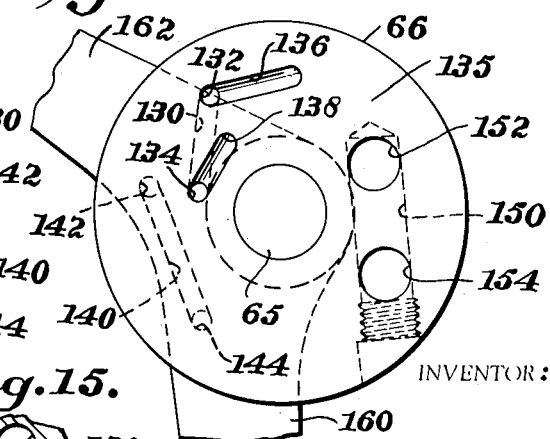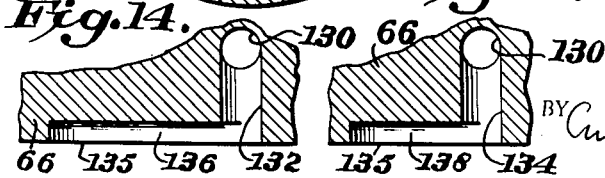

Dec. 27, 1955  R. H. BREEBACK  2,728,511
FILLING MACHINE
Filed Nov. 12, 1952  9 Sheets-Sheet 8
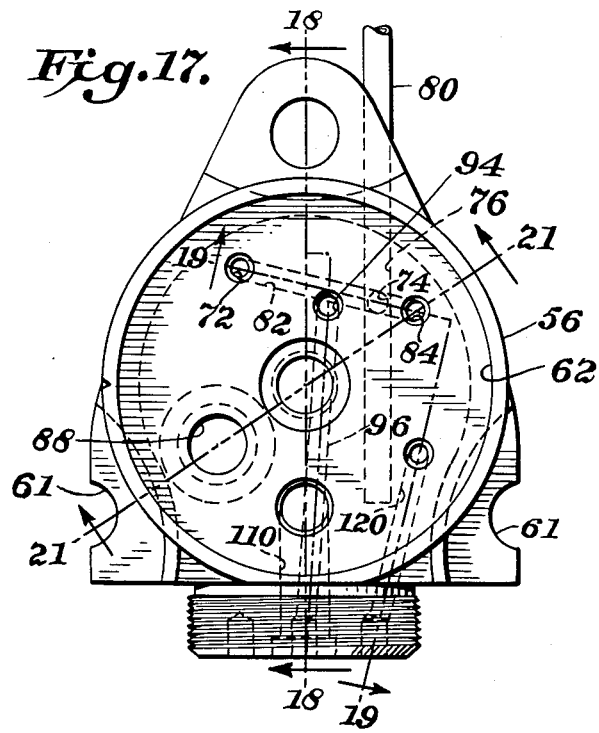
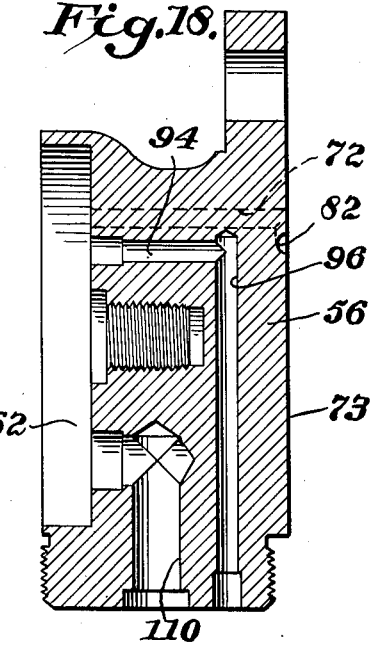
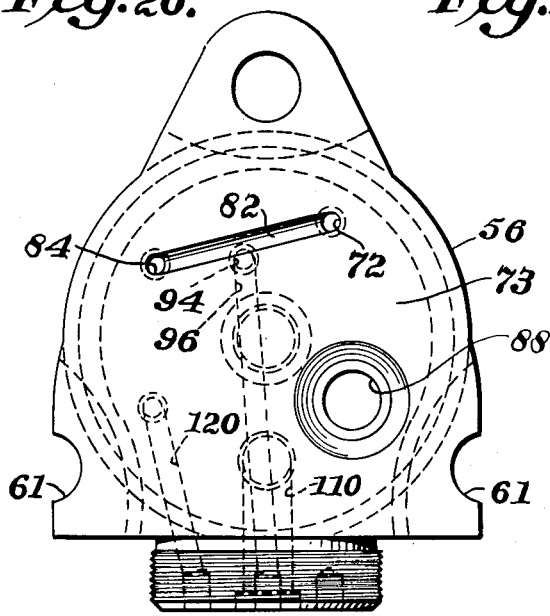
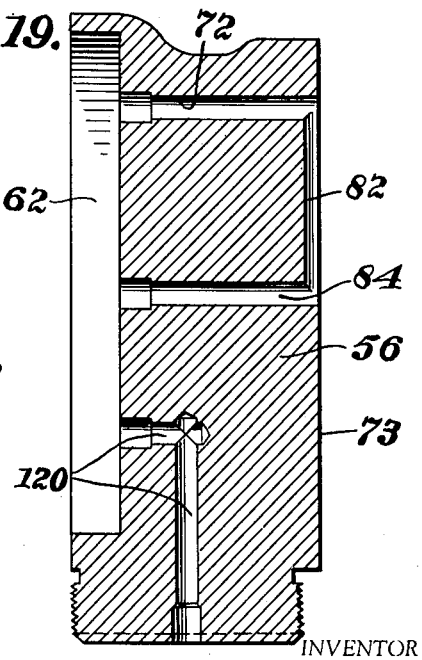
INVENTOR:
*Rudolph H. Breeback,*
BY *Cushman, Darby & Cushman*
ATTORNEYS.

Dec. 27, 1955     R. H. BREEBACK     2,728,511
FILLING MACHINE
Filed Nov. 12, 1952     9 Sheets-Sheet 9
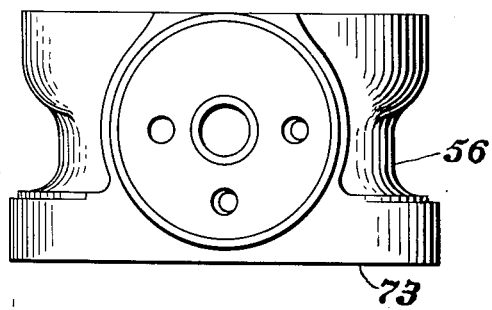
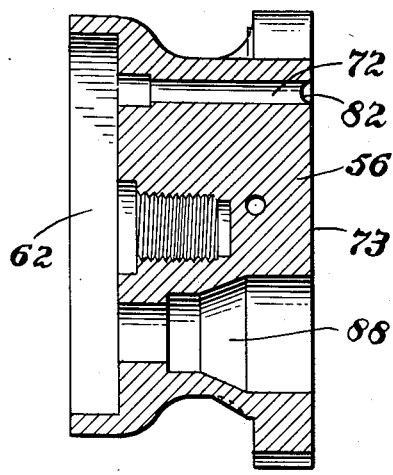
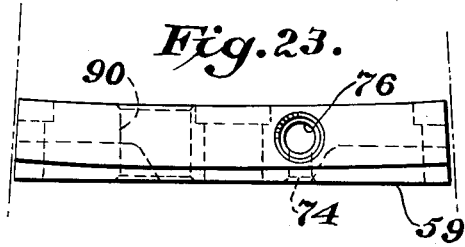
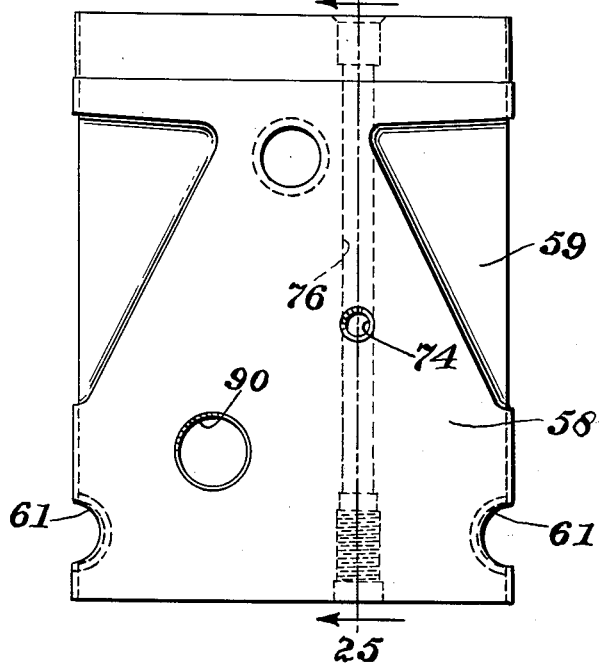
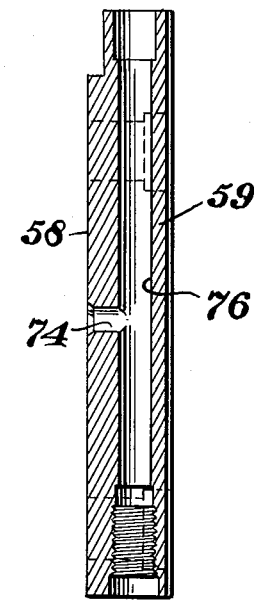
INVENTOR:
*Rudolph H. Breeback,*
BY *Cushman, Darby & Cushman*
ATTORNEYS.

United States Patent Office 2,728,511
Patented Dec. 27, 1955

2,728,511

FILLING MACHINE

Rudolph Henry Breeback, Baltimore, Md., assignor to Crown Cork & Seal Company, Inc., Baltimore, Md., a corporation of New York Application November 12, 1952, Serial No. 319,970

16 Claims. (Cl. 226—98)

The present invention relates to filling machines and, more particularly, to filling heads and trip arrangements therefor, such as used on beverage fillers.

The present invention primarily relates to beverage filling machines of the rotary type and wherein the filling head includes a rotary disk valve including upwardly and downwardly extending operating arms and which arms are arranged to contact with fixed trips spaced about the rotary path of the filling table.

In machines including rotary disk valves of the type described above, it heretofore has been necessary to rotate the disk valves through a vertical arc of the order of 78° in order to move the disk valve passages between flow closing position and the various flow positions required by the filling cycle. Furthermore, it has been necessary to move the valve disk operating arm from one side of a vertical plane to the opposite side of such vertical plane. In more detail, by prior practice, when the disk valve was in liquid flow position, the upper operating arm of the valve has been inclined forwardly from a vertical plane, and in order to move the valve disk to the next required position, it has been necessary to move the upper operating arm from such forwardly inclined position to a rearwardly inclined position. Hence, the upper operating arm has moved through a vertical plane.

The means provided to move the upper valve operating arm between the liquid flow position and the closed position as described above heretofore has comprised a trip which frequently consisted of a roller mounted on a horizontal axis to extend into the path of travel of the upper operating arm with the filling reservoir. It has been found that undesirable friction results if the above-mentioned trip roller moves the upper operating arm through a vertical plane or past top dead center, especially with high production machines, that is, machines wherein the filling reservoir and table rotate at relatively high speed to thereby produce, with other factors, a high output of filled containers. This difficulty can be eliminated by reducing the arc of travel of the operating arms so that they need not move through a vertical plane.

An object of the present invention is to provide a filling head of such design that the disk valve thereof will be operable between closed position and its various flow controlling positions by movement through a minimum arc of travel.

A further object of the invention is to provide a filling head of such design that it can be operated between closed position and the final flow position within an arc of travel which does not require movement of an operating arm through a vertical plane.

Another aspect of the invention relates to the positioning of the filling heads upon the rotary superstructure of a filling machine. More specifically, one system of obtaining a maximum output of filled containers from a machine of given dimensions is to provide the reservoir superstructure and filling table of the machine with an optimum number of filling heads and platforms. The above-mentioned reduction in the arc of movement of the filling head disk valves, taken with other factors, permits an increase in the number of filling heads which can be provided upon a superstructure of a given diameter.

Another object of the invention is to provide a rotary filling machine of such design that a maximum number of filling heads can be provided upon the rotary superstructure.

Another object of the invention is to provide filling head disk valves and trips therefor which will reduce the friction characteristics of those elements.

As has been stated above, if the arcuate travel of the disk valve is reduced, friction can be decreased at the trip which moves the disk valve from its final flow position. In addition, the reduction of arcuate travel also enables the trip which moves the valve to liquid flow position to have a less steep angle, thereby also reducing friction at that trip.

A further object of the invention is to provide a filling head operable through a relatively small arcuate path and having its passages designed for optimum flow characteristics.

It will be apparent that the changing of the extent of arcuate travel of a filling head disk valve requires change in the layout of the flow passages in both the filling head body and the disk valve therefor. The present invention includes a passage layout design which permits optimum flow of both gas and liquid. In general, this result is obtained by providing two simultaneously usable passageways for counterpressure gas flow.

Other objects and advantages of the invention will be apparent from the following specification and accompanying drawings:

In the drawings:

Figure 1 is a plan view showing the portion of the base table at which delivery and removal of containers with respect to the filling table occurs, the view also including a showing of the filling valve operating trips and container supports of the filling table. The view omits the filling heads mounted on the filling table superstructure;

Figure 2 is a diagrammatic view showing the filling valve operating trips in front elevation;

Figure 3 is a top plan view of the trip which moves the filling head valves to filling stage position;

Figure 4 is a section on the line 4—4 of Figure 3;

Figure 5 is a front elevation of the filling head of the invention with an associated bottle and container supporting platform;

Figure 6 is a diagrammatic sectional view of the Figure 5 filling head illustrating a number of the flow passages;

Figure 7 is a sectional view on the line 7—7 of Figure 6 and showing the filling valve disk in neutral or closed stage position, the view being on a larger scale than both Figures 5 and 6;

Figure 8 is a section similar to that of Figure 7 but showing the filling valve disk in the position it occupies for counterpressure stage as well as for blowout stage. The view also includes a central section through the adapter forming part of the filling head;

Figure 10 is a front elevation of the disk valve included in the present invention;

Figure 11 is a section on the line 11—11 of Figure 10;

Figure 12 is a section on the line 12—12 of Figure 10;

Figure 13 is a section exposing flow passages of the disk valve;

Figure 9:
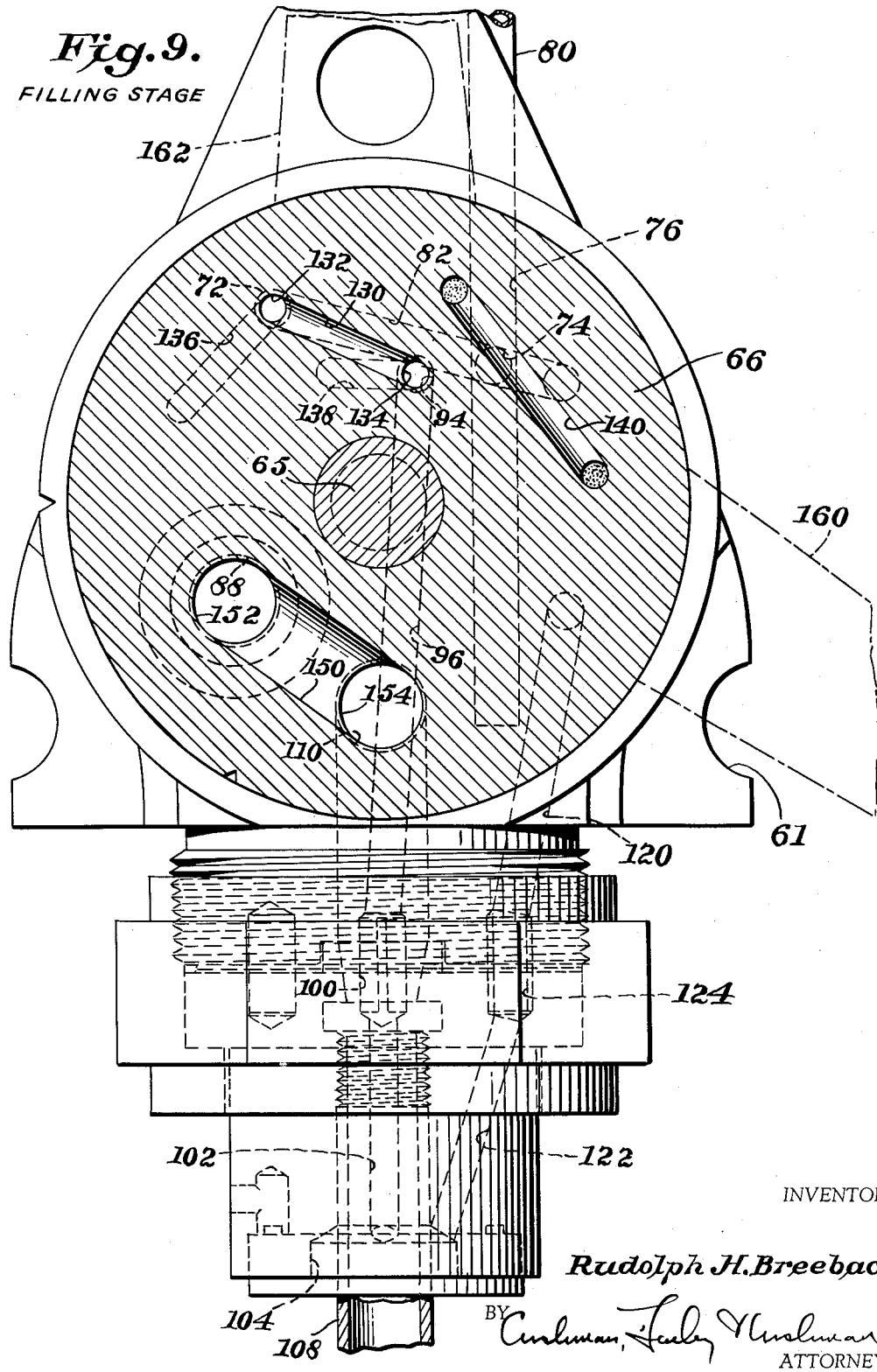
Figure 9 is a view similar to Figure 7 but showing the filling valve disk in filling stage position.

Figures 14 and 15 are fragmentary sections on the lines 14—14 and 15—15, respectively of Figure 13;

Figure 16 is a view of the seat face of the disk valve, that is, looking toward Figure 11 from the right;

Figure 17 is an elevation of the seat face of the filling head body;

Figure 18 is a sectional view on the angled line 18—18 of Figure 17;

Figure 19 is a sectional view on the angled line 19—19 of Figure 17;

Figure 20 is an elevation of the rear face of the filling head body, the view showing Figure 18 as viewed from the right;

Figure 21 is a sectional view on the line 21—21 of Figure 17;

Figure 22 is a bottom view of the filling head body;

Figure 23 is a top view of the mounting plate shown in Figure 24;

Figure 24 is a front view of the mounting plate on which the filling valve body is mounted; and Figure 25 is a sectional view on the line 25—25 of Figure 24.

The embodiment of the invention disclosed herein is intended for use in filling beer but it will be understood that other carbonated beverages may be filled with the arrangements of the invention. Referring to Figure 1, the numeral 40 designates the usual stationary or work table of a rotary beverage filler including a straight line container conveyor 42 movable across the upper surface of table 40. Bottles or other containers to be filled with beer or other carbonated beverages move into the machine on conveyor 42 and are removed therefrom by a rotary dial 44 which moves the containers through the arcuate path defined by guide plate 46 so that successive containers will be positioned on the vertically reciprocal container supporting platforms 48 of the rotary filling table 50.

In accordance with usual practice, the filling table 50 includes a superstructure positioned above the filling platforms 48. Such an arrangement is shown in Robert J. Stewart patent, No. 2,367,899, issued January 23, 1945. The superstructure will comprise a centrally located reservoir for liquid and gas and a horizontally extending skirt including a peripheral vertical flange such as indicated at 52 in Figure 6. A plurality of filling heads generally designated 54 are secured to flange 52 as hereinafter described. By this arrangement, the depending nozzle of each filling head will be aligned with a corresponding filling platform or container supporting platform 48 of the filling table 50.

Referring to Figure 6, it will be observed that each filling head 54 includes a filling head body 56 secured by a bolt 57 to the outer planar face 58 of a mounting plate 59. As best shown in the upper left hand portion of Figure 2, adjacent mounting plates 59 are secured to the flange 52 of the superstructure by bolts 60 which extend through mounting plate notches 61 (Figure 24) so that each bolt overlaps two plates. The outer surface of body 56 is circularly recessed as indicated at 62 and a gasket 63 is positioned in this recess so that the outer surface of the gasket forms the seat face 64 of the filling head body. Gasket 63 is apertured to provide for the body passages which open to recess 62. As is described in said Stewart patent and in the application for Filling Head of Rudolph H. Breeback, Serial No. 213,950, filed March 5, 1951, now Patent No. 2,701,675, issued February 8, 1955, a journal stud 65 extends outwardly from the center of recess 62 and a disk valve 66 is journalled on stud 65 to thereby control the flow of liquid and gas through the filling head 54. Disk valve 66 is held in sealed relation with gasket 63 by means of the securing means generally designated 68 and including an outer nut 70 all as described in said Breeback application.

Referring to Figures 6 and 17 to 25, the filling head body 56 includes a horizontal gas passage 72 extending from its rear face 73 to recess 62. A vertically extending bore 76 is provided in mounting plate 58, the lower end of bore 76 being closed by a plug 78 and its upper end being counterbored to receive a tube 80 which extends to the upper portion of the gas and liquid reservoir. As is best shown in Figure 20, the rearward end of gas passage 72 opens to a groove 82 formed in the rear face 73 of body 56 and groove 82 extends to a second passage 84 extending horizontally through body 56 to recess 62. Both of the passages 72 and 84 open to mounting plate bore 76 via groove 82. In more detail, Figure 17 best shows the relation of groove 82 to the bore 76 of mounting plate 58 and it will be noted from this figure as well as from Figure 25 that a port 74 in plate 58 places plate bore 76 in communication with groove 82 at a point along groove 82 close to passage 84. A gasket 86 positioned between the rear face of body 56 and mounting plate 58 forms a seal between these two elements except at port 74.

As best indicated in Figure 6 and as also shown in Figures 17 to 25, body 56 includes a liquid passage 88 of usual form extending from its rear face 73 to recess 62 and which passage is enlarged at its rearward end to receive a ball check valve in accordance with customary practice. The rearward end of liquid passage 88 is aligned with a passage 90 (Figures 23 and 24) in mounting plate 58. As best shown in Figure 6 a liquid tube 92 will extend from mounting plate bore 90 to the lower portion of the liquid reservoir.

The passages described above comprise the gas and liquid passages leading from the gas and liquid reservoir to the seat face of filling head body 56.

Referring now to the passages which extend from the filling head body seat face to the filling nozzle, as is best shown in Figures 6 and 18, a gas passage 94 extends rearwardly from the body seat face and opens to a vertical passage 96, which latter extends downwardly to open to the adapter collar 98 (Figure 6). At its lower end, passage 96 has bushing 100 mounted therein, the bushing being provided with a small bore to thereby restrict the flow through passages 96 and 94. Bushing 100 aligns passage 96 with an inclined passage 102 in collar 98, passage 102 having its lower end opening to a circular recess 104 in the lower end of adapter 98. Recess 104 is surrounded by a downwardly facing packing ring 106. Recess 104 surrounds the filling nozzle 108 of the filling head.

A right-angled liquid passage 110 extends from the filling head body seat face and downwardly to open centrally of the adapter 98. This passage is continued in adapter 98 by the filling tube or nozzle 108 which is of usual form. A centering bell 112 is vertically slidable on filling nozzle 108, centering bell 112 including a downwardly facing sealing ring 114 surrounding the tube 108 and adapted to be engaged by the mouth of a container to thereby seal the container to the filling head. The upper surface of centering bell 112 is adapted to seal against the packing 106 of adapter 98 when a bottle or other container lifts the bell by reason of the rising of the container supporting platform 48. Centering bell 112 is provided with a plurality of helical passages 116 which surround filling nozzle 108 and will be in communication with recess 104 when the centering bell is lifted. The passage 116 will open to the mouth of the container and within packing 114 when a container is in sealed position with respect to the centering bell.

As best shown in Figures 17, 19 and 20, a second gas passage 120 of right-angled form extends from the filling head body seat face to the adapter 98 and, as illustrated in Figure 8, passage 120 opens through a bushing 124 to an inclined passage 122 in adapter 98. Bushing 124 has a bore of the same diameter as the passages 120 and 122. Passage 122 is inclined inwardly to also open to the recess 104 in adapter 98.

Disk valve 66 is shown in detail in Figures 10 and 16 and also is shown in diagrammatic section in Figures 7 to 9. Referring to Figure 10, disk valve 66 includes a passage 130 which, as indicated in Figure 6, is of U-shaped form to include two ports 132 and 134 opening to the seat face 135 of the valve. As best shown in Figure 16 and as also appears in Figure 14, the seat face 135 of valve 66 has a straight line groove 136 formed therein and extending in a generally clockwise direction (as viewed in Figure 16) from the port 132. As also shown in Figure 14 and in Figure 15, the seat face 135 of valve 66 also is provided with a straight line groove 138 extending from port 134. Groove 138 extends toward groove 136 but does not connect therewith. It will be observed that the grooves 136 and 138, in effect, form extensions of the ports 132 and 134, respectively.

A second U-shaped gas passage 140 is formed in disk valve 66, passage 140 including ports 142 and 144 at its opposite ends and which ports open to the seat face 135 of the valve. Disk valve 66 also includes a U-shaped liquid passage 150 including ports 152 and 154 opening to the seat face and arranged to bridge the liquid passages 88 and 110 of body 56 as indicated in Figure 6.

As best shown in Figures 10 and 11, disk valve 66 is provided with a lower and downwardly extending operating arm 160 and an upper operating arm 162. Referring to Figure 10, the arms 160 and 162 lie at an angle of approximately 120° with respect to each other though the lower arm 160 has most of the material therein positioned somewhat to the right of the vertical center line of the disk valve. In accordance with usual practice, lower arm 160 is provided with a forwardly extending lug 164 including a leading face 166 which lies at an angle of approximately 30° to the vertical radius of the disk valve so that surface 166 is downwardly inclined in a trailing direction. The upper arm 162 has its upper and leading surface 168 rounded. As is hereinafter explained, surface 166 of the lower arm and the leading surface of upper arm 162 are arranged to contact with trips spaced about the path of rotation of the filling table, the trips thereby causing the disk valve to be rotated to the successive positions indicated in Figure 5.

As is best indicated in Figures 10 and 11, the lower operating arm 160 is provided with a recess 168 near the inner end of its face 169, namely, its face which will be leading during rotation of the filling table 50. Recess 168 includes a flat wall 170 in the plane of rotation of the valve disk and its rearward or right-hand wall 171 is arcuate. It will be noted from Figure 10 that wall 171 extends back to the radial plane 171a along which arm 160 generally extends, though the greater part of the cross-section of arm 160 is rearward or to the right of radial plane 171a. The purpose of recess 168 is subsequently described.

The arrangement of the valve operating trips is best illustrated in Figures 1 and 2 from which it will be observed that the work table 40 of the filling machine has a vertical post 172 extending upwardly therefrom and on which a trip bracket 173 is mounted for vertical movement, bracket 173 being held against rotation relative to post 172 by keys 174. At its upper end post 172 carries a hand wheel 176 which may be operated to adjust the vertical position of bracket 173 on post 172.

To the left of post 172, trip bracket 173 has a horizontally arranged cylinder 178 mounted thereon, this cylinder having a counterpressure trip CPT mounted therein and which is of the form of a retractable plunger. As is indicated in Figure 2, when a filling head 54 moves to the left from point 54A with the filling table, with the valve 66 in the position designated "Neutral or Closed Stage" in Figure 5, and if a container is positioned on the platform 48 beneath the head, plunger CPT will be in the outward position indicated in Figure 1. Therefore, the lower operating arm 160 of the filling head will contact with plunger CPT with the result that arm 160, and thereby the corresponding disk valve 66, will be swung counterclockwise to the position illustrated at point 54B in Figure 2. In Figure 5 this position of the valve arms is indicated by the dotted line showing designated "Counterpressure Stage and Blowout Stage." With valve 66 in this position, counterpressure gas will flow to the container on platform 48.

Still referring to Figures 1 and 2, at its outer left-hand end, trip bracket 173 is provided with an upstanding fitting 180 from which extends a filling trip FT. As shown in dotted lines in Figure 2, trip FT has an upwardly facing inclined surface 182 which lies at an angle of approximately 36° to a horizontal plane. When a filling head 54 moves from point 54B or 54C of Figure 2 to point 54E in that figure, the surface 166 of lower operating arm 160 will contact with the surface 182 of trip FT with the result that the valve disk will be rotated counterclockwise to the position shown at point 54E in Figure 2 and also shown in dotted lines in Figure 5 and designated "Filling Stage." With valve 66 in this position, liquid will flow to the container from the filling reservoir and air and gas will flow from the container to the reservoir as hereinafter described.

Because arm 160 extends vertically when in closed position, the radial line 171a of the arm will be at a rather steep angle relative to the vertical after the arm moves about 25° to counterpressure position. However, the surface 166 of arm 160 is so angled that in counterpressure position such surface will lie at only a slight angle with respect to the horizontal, namely, an angle of the order of 36°. Hence, the surface 182 of trip FT need only be at the same angle. This slight angularity from the horizontal of surfaces 166 and 182 insures that these surfaces will not abut with harmful impact, even though the filling table is rotating at high speed.

As is described in the application of Carl L. Day and John G. Voelker for Valve Trip Controlling Mechanism for Filling Machines, filed September 25, 1952, Serial No. 311,502, if a filling platform 48 does not receive a container from infeed dial 44, a means such as described in that application or in prior patents referred to therein will cause counterpressure trip CPT to be retracted before the valve 66 above and corresponding to that platform 48 reaches trip CPT. Therefore, that valve 66 will not be rotated to the counterpressure position indicated at points 54B and 54C but will remain in the closed position shown at point 54A. Such a valve is shown in Figure 2 at point 54D, which also makes it clear that if an arm 160 reaches filling trip FT in closed position, the lug 164 of such arm simply will pass beneath trip FT, thereby remaining in closed position throughout its travel with the filling table. However, with the filling heads positioned as closely together as contemplated by the present invention, if one valve 66 is in closed position as at point 54D, and the proceeding valve is in filling position as at point 54E, the lower arm of the leading valve normally would come into contact with the lower arm of the following valve. Such contact is avoided by the provision of the recess 168 in the lower arm 160 of each valve. In more detail, the free end or lug 164 of a valve such as shown at point 54E can nest in the recess 168 of the succeeding valve when the latter is at closed position. Hence, by reducing the thickness of the lower arms 160, as by recessing them, and by having their major cross-section to the rear of line 171a of Figure 10, it is possible to position adjacent heads as close together as possible in accordance with their diameters but without permitting the arm of a valve in filling position to contact with an immediately following valve if the latter is in closed position.

As is described in said Stewart patent, the continued movement of a filling head 54 with the filling table and reservoir in a clockwise direction as viewed in Figure 1 subsequently will bring the filling head adjacent the closing trip CT shown at the right of Figure 1.

The detailed structure of trip CT and its mounting is illustrated in Figures 3 and 4. Trip CT is mounted upon a bracket 190 illustrated at the right of Figure 1. As is disclosed in said Stewart patent, bracket 190 is supported upon posts which extend upwardly from the stationary base of the machine and the upper horizontal bar element of the bracket may be provided with apertures 192 spaced horizontally along the path of rotation of filling table 50 to enable the position of trip CT to be adjusted along that path.

Trip CT includes a housing 194 of sleeve-like form fixed to bracket 190 and including a central bore 196 in which a pin 198 is secured, pin 198 being headed at its upper end. A flat bushing secured to housing 194 surrounds pin 198 at the upper end of the housing and a trip carrier 202 surrounds pin 198 above bushing 200, carrier 202 including a central and apertured boss portion 204 which surrounds pin 198. A handle 206 extends radially outwardly from carrier 202 and the carrier also includes a horizontal bore 208 which normally extends toward filling table 50 and lies on a line radial of that table. A stud 210 is secured in bore 208 by a tapered pin 212, and a bushing 214 is mounted on stud 210, bushing 214 serving as a journal for a roller 216. Stud 210 is headed at its outer end to retain bushing 214 and roller 216 in place. Bushing 214 and roller 216 have such fit with respect to each other and stud 210 that roller 216 may freely rotate. If desired, lubricating bores and grooves may be formed in the bushing and roller to enable lubricant to flow thereon.

It will be observed from Figures 3 and 4 that, in accordance with usual practice, sockets 217 circumferentially spaced about carrier 202 are each provided with a downwardly spring urged plunger 218 which, when the trip CT is in the normal position illustrated in Figure 1, will engage a recess 220 in bushing 200. If a filling head 54 should approach trip CT with its disk valve 66 seized against rotation, the contact of the disk valve operating arm with trip CT will release the plungers 218 from the pockets 220 so that the trip may swing in a counterclockwise direction as viewed in Figure 1 and thereby avoid breakage.

When the filling head 54 approaches closing trip CT from the right in Figure 1, any container under that filling head will be filled to the desired extent because the filling head valve 66 will have been in the liquid flow position (indicated at point 54E at the left of Figure 2) since leaving filling trip FT. Therefore, the purpose of the closing trip CT is to move the disk valve to closed position to discontinue flow of liquid to the container. Trip CT is positioned at such height that the upper operating arm 162 of disk valve 66 will contact with trip roller 216. In more detail, the portion of arm 162 just below rounded surface 168 (Figure 10) will engage against the trip roller 216 with the result that the disk valve will be rotated about 60° clockwise from the position designated "Filling Stage" in Figure 5 to the position designated "Neutral or Closed Stage" in the same figure. This new position of the operating arm is shown at point 54F of Figure 2 and also is indicated in Figure 5 by the dotted line showing designated "Neutral or Closed Stage."

Referring now to the detailed action which occurs when upper arm 162 of a filling head disk valve strikes closing trip CT as has been mentioned above, when an arm 162 contacts with trip CT, the arm will be in the vertical position shown at point 54E in Figure 2, that is, the arm will extend vertically upward from the filling head. Therefore, when the arm 162 contacts with roller 216 of trip CT, the brushing of the arm 162 against and beneath roller 216 which moves arm 162 60° will only cause roller 216 to rotate about stud 210 in a clockwise direction as viewed in Figure 2. This turning of roller 216 will minimize the frictional drag between roller 216 and arm 162 and, therefore, will minimize wear upon both of these parts. It will be realized that if either of these parts becomes worn, valve 66 may not be turned to a fully closed position by trip CT. Moreover, for reasons stated below, the fact that roller 216 will rotate in only one direction when contacted by an arm 162 is highly advantageous. As generally has been discussed in the opening portion of this specification, according to prior practice as typified in the Stewart patent and also in Breeback application, Serial No. 213,951, it hereinafter has been usual to have the upper operating arm of a filling head valve lie along the dotted line X of Figure 5 when the disk valve was in its filling stage position. When an upper operating arm such as 162 lying along line X contacted with a closing trip such as indicated in dotted lines at CT$a$ in Figure 5, the arm first was moved to a vertical position and then, as the filling head continued past trip CT$a$, the arm moved further in a clockwise direction until it was about 45° below vertical position. During the time that the upper operating arm was moving from a position along line X to a vertical position, the roller of the closing trip CT$a$ would tend to rotate in a clockwise direction as indicated by the arrow 1 on trip CT$a$. However, at the instant that the arm reached a vertical position and began to swing downwardly, the roller of CT$a$ would have to change direction to move in the direction of arrow 2 of Figure 5. In other words, roller R would have to quickly reverse its direction of rotation during movement of the operating arm 162 in contact with the same.

In actual practice, the above change of direction of a trip roller did not occur because, instead of reversing rotation at the instant the operating arm reached a vertical position, the roller of CT$a$ would become fixed or seized to thereafter remain stationary so that the upper arm of the disk valve simply would drag beneath and along the stationary roller. This seizing of the trip roller at the instant it was supposed to reverse will be readily understandable when it is realized that a filling machine filling table may rotate at such speed that the filling head valve arms move past the trips at a linear speed of the order of 100 feet per minute. At this speed, it simply becomes impossible for a trip roller to reverse rotation and, instead, the roller becomes seized at the instant that the reverse rotation should occur.

It will be observed that the entire movement of the upper operating arm 162 occurs within the upper quadrant which is at the trailing side of the valve element axis.

Reverting to the filling cycle illustrated in Figures 1 and 2, after the valve 66 of the present invention has been operated to the neutral or closed position by closing trip CT, the container supporting platform 48 will be lowered to move the container downwardly and clear of the filling nozzle 108. Then the container will move into engagement with the outfeed dial 226 which will move the container through the arcuate pocket 228 of the fixed guide plate 46. Dial 226 will move the container to the rotary turret 230 of a capping mechanism. After movement through the capping mechanism, the container again will be placed upon the outfeed end of straight line conveyor 42 for removal from the machine. It will be understood that if the containers being filled are flat topped beer cans upon which a top must be seamed, the capping mechanism 230 will be omitted and outfeed dial 226 will direct the can toward a suitable seaming mechanism.

In the event it is desired to blow out the gas flow passages of the filling head 54 after the container has been removed therefrom, the blowout trip BT and the blowout closing trip BCT provided on bracket 172 will be in the operative positions illustrated in Figure 1. Blowout trip BT is similar to the counterpressure trip CPT in that it comprises a plunger to engage the lower valve arms 160 and blowout closing trip BCT is generally similar to the closing trip CT in that it includes a roller. When a filling head 54 with its disk valve 66 in neutral or closed position moves to the left from point 54F of Figure 2, the surface 166 of the lower operating arm 160 of the disk valve will engage trip BT with the result that the valve will be turned in a counterclockwise direction to the position illustrated at 54G in Figure 2, which also is shown in Figure 5 and designated "Counterpressure Stage and Blowout Stage." As will be hereinafter explained, this will cause gas from the filling reservoir to blow through the gas flow passages of the filling head to remove any liquid therefrom. An instant later, the rotation of the filling table and reservoir will cause the filling head 54 at position 54G to move past the blowout closing trip BCT. The upper operating arm 162 will engage trip BCT with the result that the disk valve 66 will rotate in a clockwise direction from the Figure 5 position designated "Counterpressure Stage and Blowout Stage" to the position designated "Neutral or Closed State," Figure 2 shows a valve in the last-mentioned position at 54A.

As will be clear from Figure 1, a filling head valve arm 160 contacts blowout trip BT at about the instant that infeed dial 44 places a container upon the platform 48 aligned with that filling head. At about the instant that the filling platform under discussion moves to the left and clear of the infeed dial 44, the corresponding valve arm 162 will contact with the blowout closing trip BCT. Therefore, before the container can be elevated to a sealed position with respect to the filling head, the valve of the filling head will have been restored to closed position by trip BCT. As has been indicated above, when the platform 48 lifts to seal the container to the filling head, the filling head and container then will move toward counterpressure trip CBT so that the incoming container will move through the rotary path described above.

As is indicated in Figure 1, a spring loaded tapping arm 232 may be provided on the machine at such point that a container entering outfeed dial 226 will contact therewith. For present purposes, it is sufficient to point out that tapping rod 232 is pivotally movable with respect to bracket 234 supported on the non-rotatable portion of the filling machine and that the tension or stroke of the tapping rod 232 may be adjusted by means of the rod 236 and hand wheel 238 shown in Figure 1. When the container shown in engagement with the tapping rod moves clear of the rod, the rod spring will cause the rod to strike the container carried by the following platform so that the container contents will foam to remove headspace air.

It will be observed that the invention disclosed herein and whereby the valve disc operating arms never move through a vertical plane largely is dependent upon the fact that the arc of rotation of the disk valve is through only 60° instead of 78° travel used in prior practice. In order to enable the movement of the valve disk to be held to 60° it is necessary to provide a novel layout of the flow passages within the filling head body 56 and the disk valve 66. The passage layout involved in the present invention to obtain this reduction in arcuate travel is described below in connection with each stage of a filling cycle.

*Neutral or closed stage*

Figure 7 illustrates the relationship of the passages of the disk valve 66 with respect to the passages of the filling head body 56 when the disk valve is in the neutral or closed stage which it will occupy during travel between the closing trip CT and the blowout trip BT of Figure 1 as well as between the blowout closing trip BCT and the counterpressure trip CPT. It will be noted from Figure 7 that in closed position the liquid flow passage 150 of the disk valve has its port 152 aligned with a blank portion of the gasket 62. If desired, a metal insert may be provided at this portion of the gasket to thereby eliminate the possibility of having the gasket swell into the port 152 if the machine stays idle for any substantial period of time. The other port 154 of passage 150 will be substantially aligned with the water supply passage 88 of the filling head body 56. It will be obvious that no flow of liquid can occur through passage 150 with valve 66 in this position.

The gas flow passage 130 will at this time have both port 132 and 134 opposite blank portions of gasket 63. In other words, neither port 132 nor 134 will be in alignment with the body ports 72 and 84 which extend through the valve body 56 to open to the groove 82 on the rear face 73 of the body. Also, throughout their entire lengths, the grooves 136 and 138 in the seat face 135 of valve disk 66 will be opposite blank portions of gasket 63. Therefore, no flow of gas can occur during this position of the disk valve 66.

With respect to the other U-shaped passage 140 of disk valve 66, both of its ports 142 and 144 will be opposite blank portions of gasket 63 so that no flow can occur through passage 140.

Assuming that a filling head with its disk valve 66 in closed or neutral position is at point 54A of Figure 2, and a container has been positioned beneath the filling head to be raised by container supporting platform 48 to the position illustrated in Figures 5 and 6, the rotation of the filling table 50 will bring the filling head adjacent the counterpressure trip CP of Figures 1 and 2 to thereby move the disk valve 66 to counterpressure stage position.

*Counterpressure stage*

In Figures 8 and 9, the flow ports of valve 66 are shown of reduced diameter when they are shown aligned with flow ports of valve body 56. This showing is purely diagrammatic, the corresponding ports of both elements actually being of the same diameter.

When the lower operating arm 160 of the filling head 54 moves to the left from point 54A of Figure 2, the contact of the lower operating arm 160 with trip CPT will cause the lower arm to move counterclockwise about 25° from the position shown in solid line in Figure 5 and designated "Neutral or Closed Stage" to the dotted line position designated "Counterpressure Stage and Blowout Stage." This movement of valve 66 will cause flow passages of the disk valve to assume the alignment with the body passages indicated in Figure 8. In more detail, the disk valve liquid passage 150 will have its ports 152 and 154 partially aligned with the liquid flow passage 88 of body 56. However, no flow of liquid can occur in this position.

In the Figure 8 position, flow of gas from the filling reservoir to the container can occur through both of the gas passages 130 and 140 of disk valve 66. With respect to passage 130, the outer end of its groove 136 will be aligned with the port 72 which extends rearwardly through body 56 and opens to the groove 82 on the rear face 73 of that body. The outer end of the other groove 138, extending from disk valve passage 130 will be aligned with the port 94 of passage 96 leading to the filling nozzle 108. This will provide one line of gas flow through valve 66. A second line of flow will occur through valve passage 140 which will have its port 142 aligned with the body port 84 and its port 144 aligned with body port 120.

Gas may now flow downwardly from the filling reservoir to the filling head through the tube 80, into mounting plate bore 76 and port 74 to the groove 82 in the rear face 73 of the filling head body 56. Gas may flow both to the right and left (Figure 8) through groove 82, the right-hand flow moving through valve disk port 140 and the left-hand flow moving through groove 136 in the seat face 135 of the valve disk, then through passage 130 and groove 138 to the body passage 96. The gas moving downwardly through body passage 96 will flow through the restricted port of bushing 100 into the passage 120 to recess 104 of the adapter collar 98 and then through the helical groove 116 (Figure 6) of centering bell 112 into the mouth of the container. The gas moving downwardly through passage 120 will move through bushing 124 and adapter passage 122 to also reach recess 104 and then flow downwardly into the container through the helical grooves 116.

It will be observed that counterpressure is thus established in the container through two passages extending between mounting plate port 74 and the helical passages 116. Therefore, counterpressure may be established within a minimum period of time so that a greater proportion of the filling cycle may be used for the liquid flow stage.

If the passage 76 and port 74 in mounting plate 59 each has a diameter of 3/16 inch, the gas passages between port 74 and the helical grooves 116 may be of slightly less diameter than 3/16 inch. For example, the groove 82 in body 56 may be approximately half-round and of a depth of 5/32 inch, the disk valve passages and the body passages 72, 84, 96 and 120 and the bore of bushing 124 may be 5/32 inch diameter, and the passages 102 and 122 in adapter 98 may be 1/8 inch diameter. The bore of bushing 100 will be 1/32 inch for reasons explained below. It thus will be noted that aside from the bore of bushing 100, the gas passages through the head will be of such size to accommodate the gas supplied from passage 76. Because foam will be cleared from bushing 100 as hereinafter described, the restriction in bushing 100 will not be of importance in reducing counterpressure flow. In any event, two gas passages will be available for counterpressure to thereby expedite establishing a pressure in the container corresponding to that above the liquid in the reservoir.

*Filling stage*

When the filling head 54 under discussion moves to the left from point 54C toward point 54E, the lower operating arm 160 of the disk valve 66 will contact with the filling trip FT to thereby rotate the disk valve 66 counterclockwise about 35° from the Figure 5 dotted line position designation "Counterpressure Stage and Blowout Stage" (the position illustrated in Figure 8) to the Figure 5 dotted line position entitled "Filling Stage" and which latter position is illustrated in Figure 9.

Referring to Figure 9, it will be observed that disk valve liquid passage 150 now has its port 152 aligned with the liquid flow passage 88 of body 56 and the other port 154 of passage 150 is aligned with the liquid passage 110 leading from seat face 63 and downwardly to the filling nozzle 108. Therefore, liquid may flow from the lower portion of the reservoir through tube 92 (Figure 6) and passage 88 to the container through the filling nozzle 108.

At the same time that liquid is entering the container, the gas and air within the container will return to the reservoir by the following passages: Through the helical passages 116, recess 104, adapter passage 102, the restricted bore of bushing 100, body passages 96 and 94, port 134 of disk valve passage 130 and through port 132 of disk valve passage 130 to the body passage 72 which opens to the groove 82 in the rear face of body 56. From groove 82 the returning gas will move through mounting plate port 74 and port 76 to tube 80 leading to the upper portion of the filling reservoir. As stated above, assuming that the gas passages within the filling head are of a diameter of the order of 5/32 of an inch, the bore of bushing 100 will have a diameter of 1/32 of an inch. This restriction of the gas return passage will permit return flow of gas in adequate volume to permit the bottle to fill at a satisfactory rate. Nevertheless, the restriction in bushing 100 will minimize the possibility of foam or liquid rising to any substantial height in the gas return passage.

It will be observed from Figure 9 that the gas passage 140 of the disk valve will not be in alignment with any ports in body 56. Also, the groove 136 and 138 in the seat face 135 of the disk valve will have no flow therethrough.

The flow of liquid into the container will continue until the level of the liquid reaches a desired level. At this time, the disk valve 66 will be moved to closed position as hereinafter described to thereby prevent further flow of liquid into the container. However, under even the closest manufacturing tolerances, one filling head may provide faster flow than another and the valve closing trip CT must be so positioned that the very slowest flow filling head will fill its container to the proper level before its valve 66 is closed. Therefore, it is possible that the fastest flowing filling head or heads on a machine may cause the liquid to flow into the container until liquid rises in the gas return passage 102 to the restricted bushing 100. The fact that the bore of bushing 100 is restricted as described above will prevent any substantial quantity of liquid from rising in passage 96, that is, above bushing 100.

It will be observed that while the present invention restricts return flow, it has the advantage of using both that restricted passage and another unrestricted passage for counterpressure flow.

*Closed stage*

When a filling head having its upper arm 162 in the Figure 5 vertical position designated "Filling Stage" reaches closing trip CT, the valve upper arm 162 will strike roller 216 of trip CT with the result that the arm will be moved clockwise through 60° from the vertical dotted line position of Figure 5 to the solid line position of the same figure designated "Neutral or Closed Stage." As has been stated above, the fact that the upper operating arm extends vertically, and is not inclined forwardly as heretofore has been the practice, will enable roller 216 to operate the valve disk without the roller becoming fixed or exerting any frictional drag upon the operating arm.

After movement past trip CT, the operating arms of the filling head will be in the position illustrated at point 54F of Figure 2 so that the lower operating arm 160 will extend downwardly and vertically. The container platform 48 immediately will lower and the container removed from beneath the filling head by outfeed dial 226 as described above. As the container descends, the removal of the filling nozzle 108 therefrom will determine the final liquid level in the container. Immediately after platform 48 lowers, the continued rotation of the filling table will bring the valve lower arm 160 into the engagement with the blowout trip BT to be rotated 25° counterclockwise.

*Blowout stage*

The relationship of the filling head flow passages during the blowout stage is illustrated in Figure 8, being identical with the flow passage used during the counterpressure stage. In other words, gas will flow downwardly from the upper portion of the filling reservoir through a mounting plate port 76 and port 74 to then move by two separate paths to adapter recess 104. At this moment, the centering bell 112 will be in lowered position on the filling nozzle 108 and gas entering recess 104 from the reservoir will flow to atmosphere to thereby clear the gas passages of foam and liquid.

The blowout stage will be very brief and will be terminated when the filling head moves past the closing trip BCT of Figure 2 which is of the same construction as the closing trip CT. Hence, the upper operating arm 162 will be moved 25° clockwise by trip BCT from the position shown at point 54G to the solid line position of Figure 5 with a minimum of frictional drag. This will again close the flow passages through the filling head in readiness to have another container placed beneath the filling head for movement through the cycle described above.

It will be observed that the structure and procedures described above will fulfill all of the objects stated herein.

The terminology used in the specification is for the purpose of description and not of limitation, the scope of the invention being defined in the claims.

I claim:

1. In a rotary filling machine, a base, a table rotatable on said base about a vertical axis, said table including a plurality of filing heads and vertically aligned container supports, each of said filling heads including a valve body and a valve element rotatable with respect to said body about an axis lying in the plane of a radius of said table axis, each of said valve elements including a pair of operating arms each lying along a line radial of the axis of its valve element and less than 180° apart, trip means carried by said base and spaced about the path of movement of said valve elements with said table for engagement with said respective operating arms, each of said valve bodies and its associated valve element including flow passages arranged with respect to said valve operating arms to provide for flow shutoff and fluid flow by movement of the valve element with respect to its valve body through a rotary path of such extent that the valve operating arms of a valve element will not move through the plane of said rotary table radius in which the corresponding valve element axis lies.

2. A filling machine of the character described in claim 1 wherein the operating arms of each valve element lie in a plane tangential to the table axis.

3. A filling machine of the character described in claim 1 wherein the pair of operating arms of each valve element lie at an angle of the order of 120° to each other and their rotary path of movement is of the order of 60°.

4. In a rotary filling machine, a base, a table rotatable on said base about a vertical axis, said table including a plurality of filling heads and vertically aligned container supports, each of said filling heads including a valve body and a valve element rotatable with respect to said body about an axis extending radially of said table, each of said valve elements including a pair of operating arms extending radially of the valve element axis, trip means carried by said base and spaced about the path of movement of said valve elements with said table to engage said arms to move the corresponding valve element between flow shutoff and flow positions, each of said valve bodies and its associated valve element including flow passages arranged with respect to said valve operating arms to provide for flow shutoff and fluid flow by movement of the valve element with respect to its valve body through a rotary path of such extent that one of the valve arms of said valve element will lie in a vertical plane at the flow position immediately preceding shutoff position, said trip to move the valve element to flow shutoff position comprising a roller rotatable about an axis radial of said table.

5. In a rotary filling machine, a base, a table rotatable on said base about a vertical axis, said table including a plurality of filling heads and vertically aligned container supports, each of said filling heads including a valve body and a valve element rotatable with respect to said body about an axis extending radially of said table, each of said valve elements including a pair of operating arms extending radially of the valve element axis, trip means carried by said base and spaced about the path of movement of said valve elements with said table to engage said arms to move the corresponding valve element between flow shutoff and flow positions, each of said valve bodies and its associated valve element including flow passages arranged with respect to said valve operating arms to provide for flow shutoff and fluid flow by movement of the valve element with respect to its valve body through a rotary path of such extent that one of the valve arms of said valve element will lie in a vertical plane at the flow position immediately preceding shutoff position and the other valve arm will lie in a vertical plane at shutoff position, said trip to move the valve element to flow shutoff position comprising a roller rotatable about an axis radial of said table.

6. In a rotary filling machine, a base, a table rotatable on said base about a vertical axis, said table including a plurality of filling heads and vertically aligned container supports, each of said filling heads including a valve body and a valve element rotatable with respect to said body about an axis lying substantially on a radius of the table axis, each of said valve elements including an upwardly and a downwardly extending operating arm, trip means carried by said base and spaced about the path of movement of said valve elements with said table for engagement with said respective operating arms, each of said valve bodies and its associated valve element including flow passages arranged with respect to said valve operating arms to provide for flow shutoff, counterpressure flow, and liquid flow by rotary movement of the valve element with respect to its valve body through an arc of the order of 60°.

7. A filling machine of the character described in claim 6 wherein the flow passages of each valve body and valve element are so arranged with respect to the valve element operating arms that limit movement of the latter in either direction will be to an upright position.

8. A filling machine of the character described in claim 6 wherein the flow passages of each valve body and valve element are so arranged with respect to the valve element operating arms that limit movement of the latter in either direction will be to an upright position, and the leading faces of the ends of the operating arms are inclined rearwardly and toward their free ends.

9. In a filling head for carbonated liquids, a body element provided with a planar seat face, a filling nozzle on said body element, a disk valve rotatable on said body element seat face, said body element including a first pair of gas passages opening to said seat face and adapted to communicate with the gas containing portion of a gas and liquid reservoir, said body element further including a first liquid passage opening from its seat face and adapted to communicate with the liquid containing portion of a gas and liquid reservoir, said body element including a second pair of gas passages and a second liquid passage extending from said seat face to said filling nozzle, said disk valve including a pair of gas passages and a liquid passage and being rotatable to respectively align its gas passages with a gas passage of each of said pairs of body element gas passages to establish counterpressure in a container sealed to said filling nozzle, and then rotate to align one of its gas passages with one passage of each of said pairs of body element gas passages and to align said disk valve liquid passage with said body element liquid passages for flow of liquid to said filling nozzle and return flow of gas.

10. A filling head of the character described in claim 9 wherein the gas passage of said second pair of body element gas passages aligned during liquid flow includes a restriction therein.

11. A filling head of the character described in claim 9 wherein the seat face of said disk valve includes grooves extending from each end of one of its gas passages.

12. A filling head of the character described in claim 9 wherein said body element includes a passage to connect said first pair of gas passages.

13. A filling head of the character described in claim 9 wherein said body element includes a rear face parallel with said seat face, and said rear face includes a groove to connect said first pair of body element gas passages, and a plate element abutting said rear face, said plate element including a port arranged to place said first pair of gas passages in communication with the gas containing portion of the reservoir.

14. In a filling machine, a rotary filling table, a plurality of filling heads circumferentially spaced about and movable with said table, each head including a valve element rotatable about an axis radial of said table, the axes of adjacent heads being spaced by a distance only slightly greater than the diameter of said valve elements, each head and valve element being provided with flow passages adapted to be aligned for flow by rotation of said valve element about its axis, each valve element including a first arm which extends in a predetermined direction radial of the valve axis when the valve element is in non-flow position and a second arm extending radially of the valve element axis and at an angle to said first arm, trips spaced about the path of rotation of said table for engagement seriatim by said valve element arms to normally move the valve element to a flow position, one of said trips being arranged in the path of movement with said table of said first arm of each valve to thereby move said first arm from non-flow to flow position, said first arm of each valve element having a minimum of its cross-section on the leading side of the radial plane in which it lies during non-flow position to thereby avoid obstructing movement of an arm of the preceding valve element to flow position.

15. A filling machine of the character described in claim 14 wherein said first arm of each valve element is recessed on its leading face at a point in the path of movement of said first arm of the immediately preceding filling head.

16. A filling machine of the character described in claim 14 wherein said first arm of each valve element extends downwardly when in non-flow position.

References Cited in the file of this patent

UNITED STATES PATENTS 2,202,033   Stewart et al. _____ May 28, 1940